Feb. 4, 1936.        W. THAL        2,029,685
SUPERVISION OF THE DIELECTRIC LOSSES OF A CONDUCTOR
Filed Nov. 30, 1932
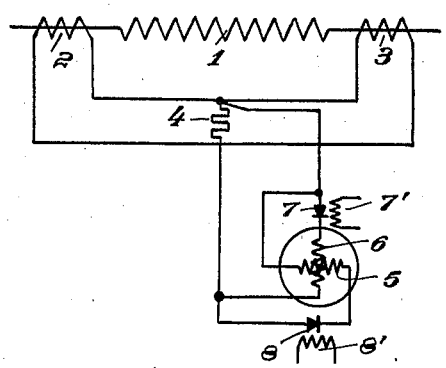
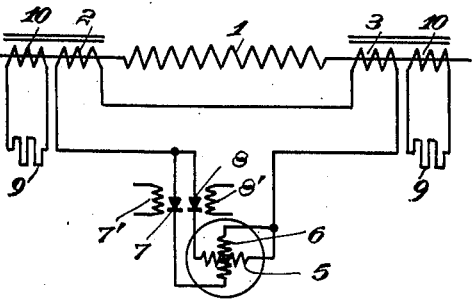
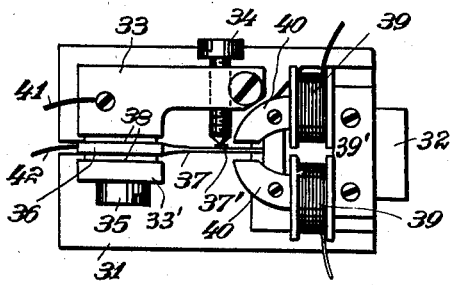
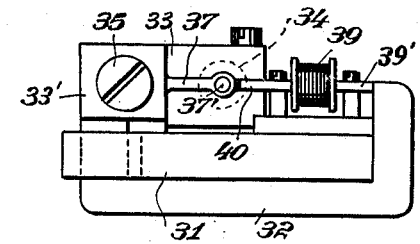
Inventor:
Wilhelm Thal
by Locka & Kellenbeck
Attorneys.

Patented Feb. 4, 1936

2,029,685

UNITED STATES PATENT OFFICE 2,029,685

SUPERVISION OF THE DIELECTRIC LOSSES OF A CONDUCTOR

Wilhelm Thal, Nowawes, near Potsdam, Germany, assignor to Siemens & Halske, Aktiengesellschaft, Siemensstadt, near Berlin, Germany, a corporation of Germany Application November 30, 1932, Serial No. 645,033
In Germany December 4, 1931

4 Claims. (Cl. 175—183)

My invention relates to the supervision of the dielectric losses of a conductor.

It is already known to measure the displacement current of a loaded conductor system to ground, by designing the beginning and the end of the system as primary windings of the same current transformer and connecting both primary windings in opposition. On the secondary side of the current transformer is then measured the difference of the current flowing into the system and flowing from the system, which difference corresponds with the displacement current. It is very difficult to install such an arrangement because it is necessary to join the beginning and the end of the conductor or systems of conductors. This is always inconvenient but sometimes even impossible, for instance if a high-tension cable is to be supervised.

The object of my invention is to eliminate these drawbacks. I attain this object by employing for measuring the displacement current to ground two separate transformers located respectively at the beginning and the end of the conductor. In view of the fact that the displacement current is only a very small percentage of the total current, the employment of two transformers for forming the very small difference has been considered impossible up to now. It has, however, been proved that provided the two transformers have been carefully balanced, it is quite possible to employ the difference formed by the transformers for determining the displacement current and that the measuring accuracy thus attainable considerably exceeded the limits laid down at the beginning. By means of my improved arrangement or system it is now possible to supervise such systems of conductors in which it is absolutely impossible to bring the beginning and the end of the conductors together in one place as for instance in high-tension cables, the supervision of which is of great importance in view of the large amount of capital invested in them and up to now is impossible in any other way.

Another feature of my invention is based upon the recognition that the measuring of the displacement current alone does not permit of a sure control of the state of the system of conductors to be supervised. Due to the fact that the displacement current is composed of an active and a reactive component it may in case of an unfavorable relation of the two components happen, that one may vary within considerable limits without the total displacement current being affected in the same way. Thus the active component, for instance, may be comparatively small in comparison with the reactive component so that the displacement current is determined substantially by the reactive current and changes in the active component are hardly noticeable. But it is just increases in the active component which indicate a deterioration of the insulation.

For this reason the displacement current is not measured according to my invention, but its components serve for the supervision of the state of insulation. A particularly simple and for many cases sufficient supervision may already be produced by merely measuring the active component which may be done in a particularly simple manner by means of a direct current measuring instrument and a series rectifier excited in phase with the operating voltage. In this measurement it is, however, necessary to take the disadvantage into the bargain that the measurement depends upon the voltage. In some cases, where the maintenance of a mean voltage within narrow limits may be relied upon, this dependence on the voltage is not objectionable. In other cases, however, the whole measurement may be made illusory thereby. This disadvantage may be eliminated by not making use of the active component alone, but the active and the reactive components together, for the measurements and then preferably forming at once within a relative measuring instrument the relation of both values, i. e. the tan $\delta$.

As measuring instrument I employ preferably a quotient meter, to the two branches of which are supplied the components located at right angles to one another of the difference voltage or of the difference current, one of said components being held in phase with the operating voltage.

In the drawing affixed to my specification and forming part thereof two embodiments of my invention are illustrated by way of example.

In the drawing:

Fig. 1 shows one embodiment in diagrammatic illustration and

Fig. 2, a preferred embodiment likewise in diagrammatic representation.

Fig. 3 is a plan view of a mechanical rectifier which I may use in connection with my invention, and Fig. 4 is a side elevation of such rectifier.

Like parts are indicated by like numerals of reference in both figures of the drawing.

Referring to Fig. 1 of the drawing, 1 is the system of conductors to be measured or supervised. 2 and 3 are two balanced current transformers located respectively at the beginning and at the end of the system, the secondary windings of which are connected in opposition on to a resistance 4, while the primaries of said transformers are connected in series with said conductor system. It will be understood that the system or line 1 has a substantial capacity. This resistance 4 is traversed by the difference of the secondary currents of the two transformers and this difference current is according to my invention split up into the active and the reactive components. For this purpose there are connected to the resistance 4 the two coils 5 and 6 of a quotient measuring instrument through rectifiers 7 and 8 having separate exciting coils 7' and 8' respectively. The rectifiers of the dry type may be used, for instance, provided their switching phases are brought into the correct position in relation to the operating voltage by special means of any well-known or approved character. Generally it will, however, be preferable to employ instead of the synchronous switches constituted by convenient oxide rectifiers, separately controlled mechanical synchronous switches, because it is then possible to adjust the switching phase more conveniently and more accurately and because these switches have negligibly small resistances in the direction of flow. In order to illustrate by a practical example a construction of a mechanical synchronous switch which may be employed in connection with my invention, I have shown such example in top view in Fig. 3 and in side elevation in Fig. 4. A plate 31 of insulating material is supported on the horizontal portion of a U-shaped permanent magnet 32. On this plate 31 is secured a block 33 of conducting material having a threaded opening to receive a contact screw 34. A screw 35 secures to the said block 33, one end 36 of a vibratory steel tongue 37 provided with a contact 37' co-operating with the contact screw 34. The swinging portion of the steel tongue 37 is reduced in thickness so as to give it a high vibration frequency. The end 36 of the steel tongue 37 is clamped between insulating washers 38 and held in position with the aid of a member 33' engaged by the screw 35. As shown in Fig. 4, the lower edge of the end 36 is in contact with one pole of the permanent magnet 32. The magnetic circuit of this permanent magnet includes two pole shoes 40, preferably laminated, which are provided with magnetizing coils 39 and which are connected by a cross member or yoke 39' in contact with the other pole of the permanent magnet 32. At 41 and 42 I have indicated wires one of which leads to the block 33 and thus to the contact screw 34, while the other leads to the steel tongue 37 and its contact 37'. The apparatus shown in Figs. 3 and 4 constitutes a mechanical rectifier, and the coils 39 are connected in series in such a way as to impart opposite polarities to the two pole shoes 40. It will be obvious that when an alternating current passes through the coils 39, the steel tongue 37 will vibrate in synchronism with the alternating current. The natural frequency of oscillation of the steel tongue 37 is far above the frequency of the alternating current flowing through the coils 39, and thus the result will not be affected by the natural vibration frequency of the tongue 37. This tongue will therefore vibrate in synchronism with the alternating current without any shifting of phase so that every time the energizing current passes through zero, the contact 37' will either just engage the contact screw 34, or just leave such contact screw. Figs. 3 and 4 therefore show details of construction of one form of mechanical synchronous switch which may be substituted for the synchronous switches constituted by the rectifiers indicated at 7, 8 in Figs. 1 and 2. The measuring instrument diagrammatically indicated by the coils 5 and 6 measures directly the relation of the active displacement current to the reactive displacement current, i. e. the tan $\delta$. This tan $\delta$ does not only give fuller information about the state of insulation, than can be gathered from the mere measurement of the displacement current, but it is above all far better suited to supervise the state of insulation of the system permanently. In itself an insulation may be good at very different values of tan $\delta$ because in spite of a large active displacement current an insulation may be in a perfect condition and fully comply with all requirements of the service. On the other hand it will be possible from variations of the tan $\delta$ during operations to come to the sure conclusion of a deterioration of the state of the insulation; an increase of the tan $\delta$ will as a rule point at least to a local breakdown.

The above described measuring arrangement may according to another feature of my invention be further improved in principle. It has the fault that when making measurements on the basis of the voltage difference of both transformers the instrument is worked in the lowest part of the magnetization curve, due to the very low load on the transformer, and when making measurement on the basis of the current difference, due to the high transformer load, in the topmost part of said curve. As these two parts of the curve are comparatively flat, the sensitivity of the measurement is very adversely affected. According to my invention it is possible when measuring the voltage difference to work in the steep portion of the magnetizing curve of the transformer iron, by additionally loading both transformers secondarily, for instance by providing each of the transformer cores with an additional secondary winding closed through a resistance. By suitably selecting this resistance the load of the transformer iron may be placed within the desired step gradient of the magnetizing curve, straightness being apart from the steepness the main consideration. This provision is particularly important when using transformers with nickel iron cores, because in these the first and the last part of the magnetizing curve are particularly flat and a central portion particularly steep. These cores are also particularly suitable for the reason that their high initial permeability increases the sensitiveness of the measurement at low working currents considerably.

An embodiment of my invention for the employment of additionally loaded transformers is illustrated in Fig. 2 of the drawing.

Here 1 is again the conductor to be supervised. 2 and 3 are again the two current transformers which are provided with additional secondary windings 10 closed through resistances 9. The resistances 9 might equally well be connected between the terminals of the measuring coils. The secondary windings serving for the measurement are connected in opposition. In one of the connecting leads there are connected the two coils 5 and 6 of the quotient meter. The rectifiers 7 and 8 are again indicated as synchronous switches excited separately by coils 7' and 8' respectively. The excitation of one is in phase with the operating voltage while the excitation of the other is displaced in phase by 90°.

The measurement of the tan δ according to my invention may in some cases preferably be supplemented by a measurement of the displacement current. This arrangement and system of connection of the transformer may directly be utilized for such a measurement. It is sufficient to add a further measuring instrument upon which the displacement current may be read off. As measuring instrument a direct current instrument is preferably used with series rectifiers displaced in phase to the operating voltage by an angle of 90°. Instead of the displacement current one of the two components may be measured separately and from it and the measured tan δ the total displacement current may be calculated.

My improved arrangement or system may be employed with advantage wherever it is desired to determine either the displacement curent of a system of conductors during the operation of the plant, but above all in cases where a system of conductors under the load of the plant is to be continuously supervised as regards its state of insulation to ground. Such cases are, for instance, the windings of large generators, large converters, high-tension cables and so on. This improved supervision is utilized with advantage for the reason that the control is not limited to certain parts, as for instance to the supervision of the temperature by thermo-couples, but because all parts of the system of conductors are uniformly treated.

I claim as my invention:

1. In an arrangement for supervising the dielectric losses which a conductor system of substantial capacity experiences under operating voltage, a current transformer located at the beginning of said conductor system, a current transformer of the same characteristics located at the end of said conductor system, the primary windings of said current transformers being connected in series with said conductor system, the transforming ratio of said transformers being so selected that in the event of a perfect insulation of the conductor the currents or voltages induced in the secondaries of said transformers will be equal to each other, a direct current measuring instrument, means for connecting said secondaries with each other in opposition, a separately controlled synchronous switch, means for connecting said secondaries with said instrument by way of said switch in such a way that the difference between the currents or voltages induced in the said secondaries will act on said instrument, and means for controlling said synchronous switch in phase with the operating voltage in the conductor system.

2. In an arrangement for supervising the dielectric losses of a conductor system under operating voltage, a current transformer located at the beginning of said conductor system, a current transformer of the same characteristics located at the end of said conductor system, the primary windings of said current transformers being connected in series with said conductor system, the transforming ratio of said transformers being so selected that in the event of a perfect insulation of the conductor the currents or voltages induced in the secondaries of said transformers will be equal to each other, a direct current quotient measuring instrument having two measuring coils, connections linking said secondaries with each other in opposition, means for connecting said secondaries with said measuring instrument, two separately excited synchronous switches included in said connecting means ahead of said measuring coils and excited, with respect to their phase position, in such a manner that one of said measuring coils will be supplied with that component of the difference between said induced currents or voltages which is in phase harmony with the operating voltage, while the other of said measuring coils will be supplied with that component of said difference which is at right angles to the operating voltage.

3. In an arrangement for supervising the dielectric losses of a conductor system under operating voltage, a current transformer located at the beginning of said conductor system, a current transformer of the same characteristics located at the end of said conductor system, the primary windings of said current transformers being connected in series with said conductor system, the transforming ratio of said transformers being so selected that in the event of a perfect insulation of the conductor the currents or voltages induced in the secondaries of said transformers will be equal to each other, a measuring instrument having means for indicating the effective component of the difference between said induced currents or voltages, means for connecting said secondaries with each other in opposition, a separately controlled synchronous switch, means for connecting said secondaries with said instrument by way of said switch in such a way that the difference between the currents or voltages induced in the said secondaries will act on said instrument, means for controlling said synchronous switch in phase with the operating voltage in the conductor system, and an additional secondary load for the two transformers arranged in such a way that at normal strength of the operating current the saturation of the transformer iron will be located in as steep and as straight a portion of the magnetization curve as possible.

4. In an arrangement for supervising the dielectric losses of a conductor system under operating voltage, a current transformer located at the beginning of said conductor system, a current transformer of the same characteristics located at the end of said conductor system, the primary windings of said current transformers being connected in series with said conductor system, and the cores of said transformers consisting of an alloy of high initial permeability, the transforming ratio of said transformers being so selected that in the event of a perfect insulation of the conductor the currents or voltages induced in the secondaries of said transformers will be equal to each other, a direct current measuring instrument, means for connecting said secondaries with each other in opposition, a separately controlled synchronous switch, means for connecting said secondaries with said instrument by way of said switch in such a way that the difference between the currents or voltages induced in the said secondaries will act on said instrument, and means for controlling said synchronous switch in phase with the operating voltage in the conductor system.

WILHELM THAL.